United States Patent

Sainte-Beuve

[15] 3,699,446

[45] Oct. 17, 1972

[54] DIFFERENTIAL PULSE CODE MODULATOR SYSTEM WITH CYCLIC, DYNAMIC DECISION LEVEL CHANGING

[72] Inventor: Philippe Sainte-Beuve, Paris, France

[73] Assignee: U.S. Philips Corporation, New York, N.Y.

[22] Filed: Dec. 24, 1970

[21] Appl. No.: 101,268

[30] Foreign Application Priority Data

Dec. 31, 1969 France......................6945677

[52] U.S. Cl................325/38 A, 178/DIG. 3, 178/68

[51] Int. Cl............................................H04l 27/02

[58] Field of Search................325/38 R, 38 A, 38 B; 340/347 DD, 347 AD; 178/68, DIG. 3; 179/15.55

[56] References Cited

UNITED STATES PATENTS

| | | | |
|---|---|---|---|
| 3,492,431 | 1/1970 | Rees | 325/38 B |
| 3,490,045 | 1/1970 | Boer et al. | 325/38 B |
| 3,555,423 | 1/1971 | Weston | 325/38 B |

*Primary Examiner*—Benedict V. Safourek
*Attorney*—Frank R. Trifari

[57] ABSTRACT

A device for the transmission of an information signal by means of pulse code modulation features a quantizing circuit controlled by a control circuit so that the decision levels of the quantizing circuit are cyclically changed between predetermined minimum and maximum values.

5 Claims, 9 Drawing Figures

Figure 1A:
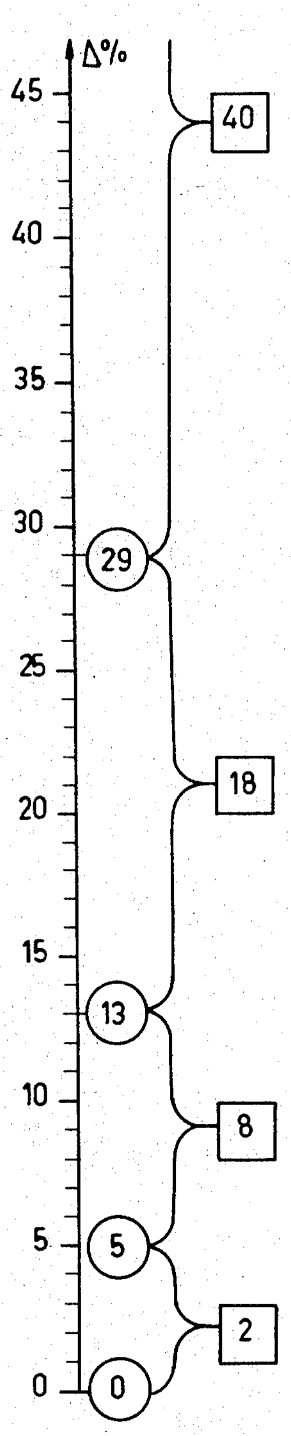

DIFFERENTIAL PULSE CODE MODULATOR SYSTEM WITH CYCLIC, DYNAMIC DECISION LEVEL CHANGING

The invention relates to a device for transmitting information signals by means of a pulse code, which device includes a quantizing circuit controlling a pulse code modulator for the purpose of generating code groups and which device furthermore includes a comparison circuit having an integrating network which integrates signals corresponding to the quantized signals so as to obtain a comparison signal which together with the information signals to be transmitted controls a difference producer so as to obtain a difference signal which is applied to the quantizing circuit, the code groups generated by the pulse code modulator characterizing every time the magnitude and the sign of the instantaneous value of the difference signal.

To achieve an efficient separation between the information signals of arbitrary nature and the background noise which accompanies the transmission of these information signals it is known to use the conversion of a signal of an analog character into a series of code pulses in which each code pulse or each group of code pulses corresponds to a certain sampling of the signal of the transmitted. The number of pulses which is to be transmitted so as to provide a sufficiently reliable reproduction of an initially analog signal generally corresponds to the use of a passband which is larger than the band required for the analog signal itself, which will be difficult especially when the signal to be transmitted is already a broad-band signal itself, such as a television video signal.

One of the means proposed to reduce the required passband is the use of the redundancy of the information in the analog signal by transferring at each instant only the variation of the signal relative to the previously transferred value; due to this fact the corresponding method of transmission is sometimes referred to as "-delta-modulation transmission."

A device of the kind described in the preamble for transmitting information signals by means of difference pulse code modulation is known, for example, from French patent specification 1,041,766.

The quality and the reliability of a signal transmitted by means of differential pulse code modulation are dependent on the number of quantized levels used, the use of a comparatively large number of representative levels for the variations to be transferred providing a better transmission, but leading to a pulse code which necessitates a large number of code pulses per code group and a larger bandwidth for the transmission.

Thus, a compromise must be settled between the quality of the transmission and the bandwidth required for this purpose.

It is known that a considerable element of the reduction in redundancy of the information signals in a representative analog signal of a tone or a picture line consists of, for example, a reduction in the number of transmitted representative levels both in the case of transmission of absolute levels and in the case of the transmission of difference levels; this reduction is obtained with the aid of a quantizing circuit which, for a certain level value, determines the transmission of a given representative level and, for other level values, determines the transmission of other, likewise given, representative levels. When difference levels are transmitted the analog signals corresponding thereto are applied during reception to an integrating network and the accuracy by which the voltage at the terminals of the integrating network reproduces the original signal is dependent on the number and the spread in the representative levels which may be transmitted. The number of levels which may be transmitted is dependent on the number of code pulses in a code group which is destined for the transmission of each sampling of the information signal in which case generally a binary pulse code is used; if, for example, a pulse code having three bits per code group is used, it is possible to transmit a difference level suitably chosen from four positive difference levels and four negative difference levels. If, for example, the quality of the transmission is to be improved by using eight positive and eight negative difference levels, a pulse code having four bits per code group must be used which necessitates a bandwidth which is 33 percent larger than in the case of transmission of a pulse code having three bits per code group.

The object of the present invention is to provide a device of the kind described in the preamble with which a reproduction quality of the transmitted information signals can be achieved which substantially corresponds to the quality which would be provided by a double number of representative levels but without changing the number of bits per code group of the pulse code and without enlarging the passband required for a satisfactory transmission of the code pulses.

The invention is based on the recognition of the fact that the senses, for example, in the transmission of a television video signal : the eye, act to a certain extent as a level integrator, of which the perception emanating from observations located sufficiently closely together with respect to time and space has the character of a mean value.

The device according to the invention is characterized in that a control circuit is connected to the quantizing circuit by which control circuit the values of the decision levels from which the quantizing circuit determines the representative levels of the quantized difference signal are cyclically changed between a given minimum value; and a given maximum value which are allotted to each of the respective decision levels used.

With a suitable choice of the maximum and minimum values and optionally the intermediate values for each decision level relative to the mean value of the levels, while taking into account the stepwise succession of the mean values of the decision levels, the use of the steps according to the invention makes it possible in the transmission of television video signals to considerably improve the display of the contours which correspond to the difference levels located halfway between two successive representative levels, especially the contours which correspond to the large variations in brightness of the picture. In such circumstances the quality of the display obtained substantially corresponds to the quality which would be given by at least a double number of representative levels, said improvement being obtained without changing the number of bits per code group used for the transmission of the magnitude of the difference level and without enlarging the passband required for the transmission of code pulses.

Figure 1B:
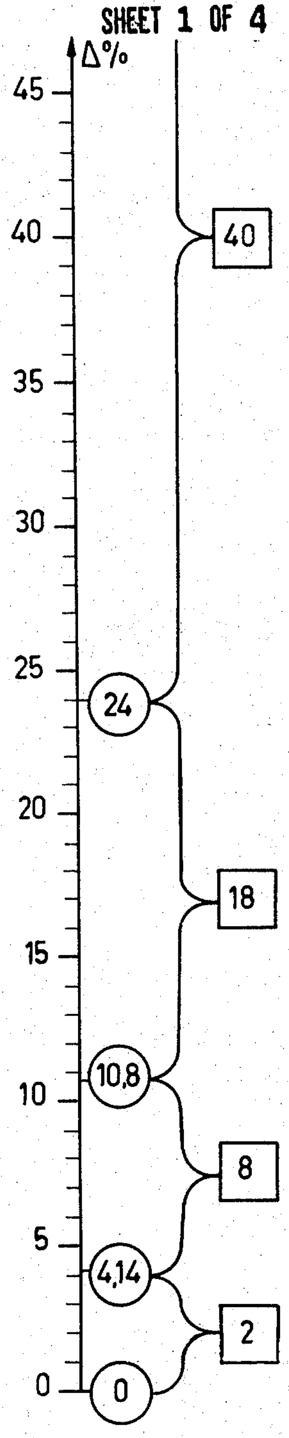
Figure 1C:
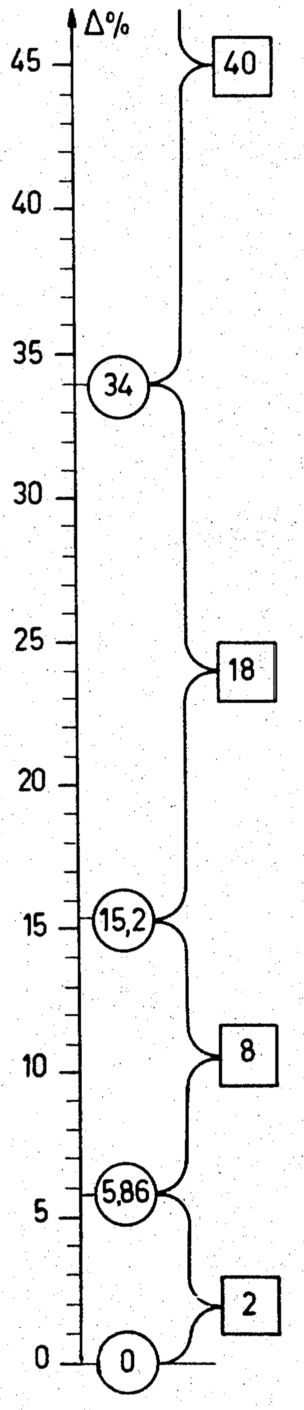
Figure 2:
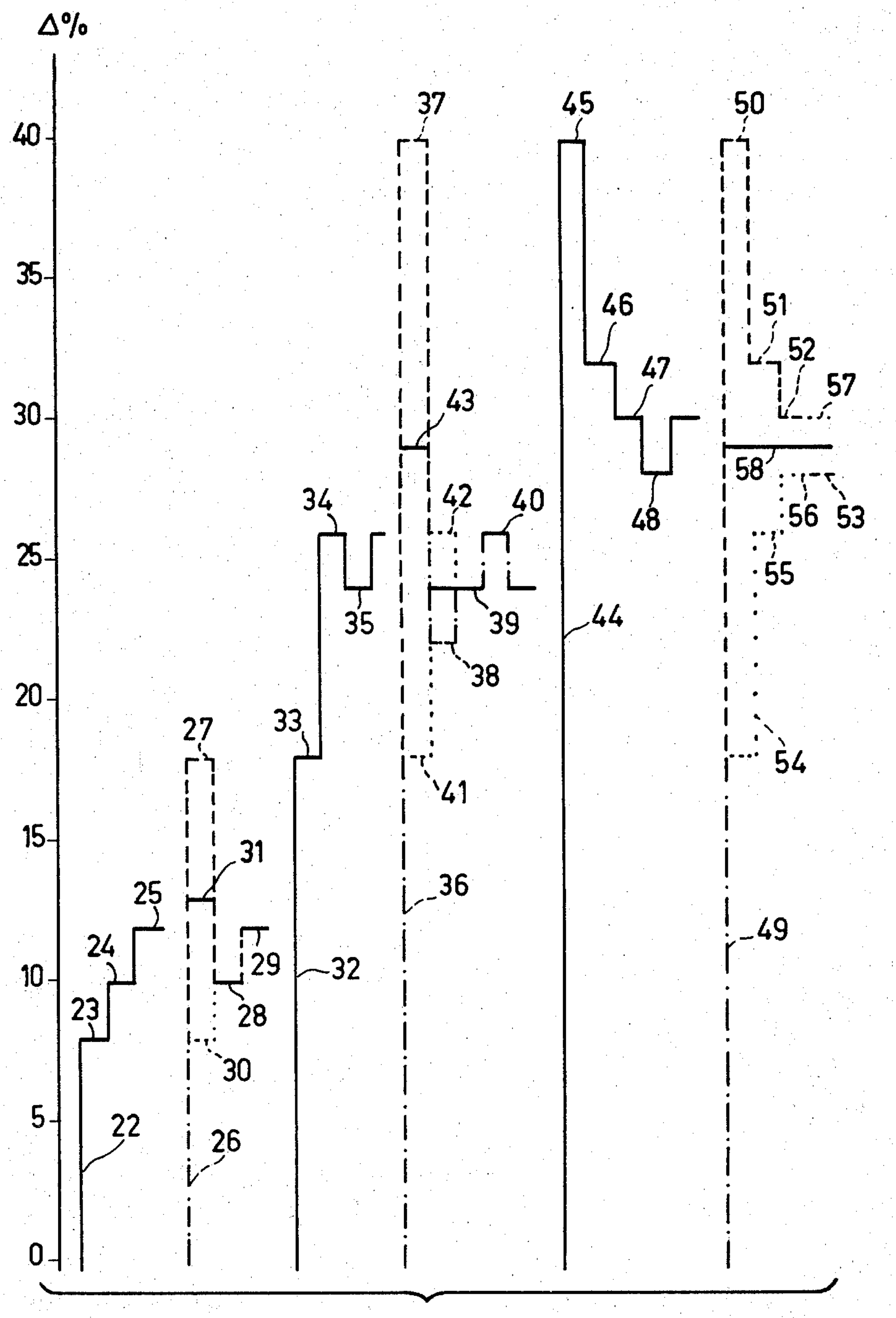
Figures 3A, 3B:
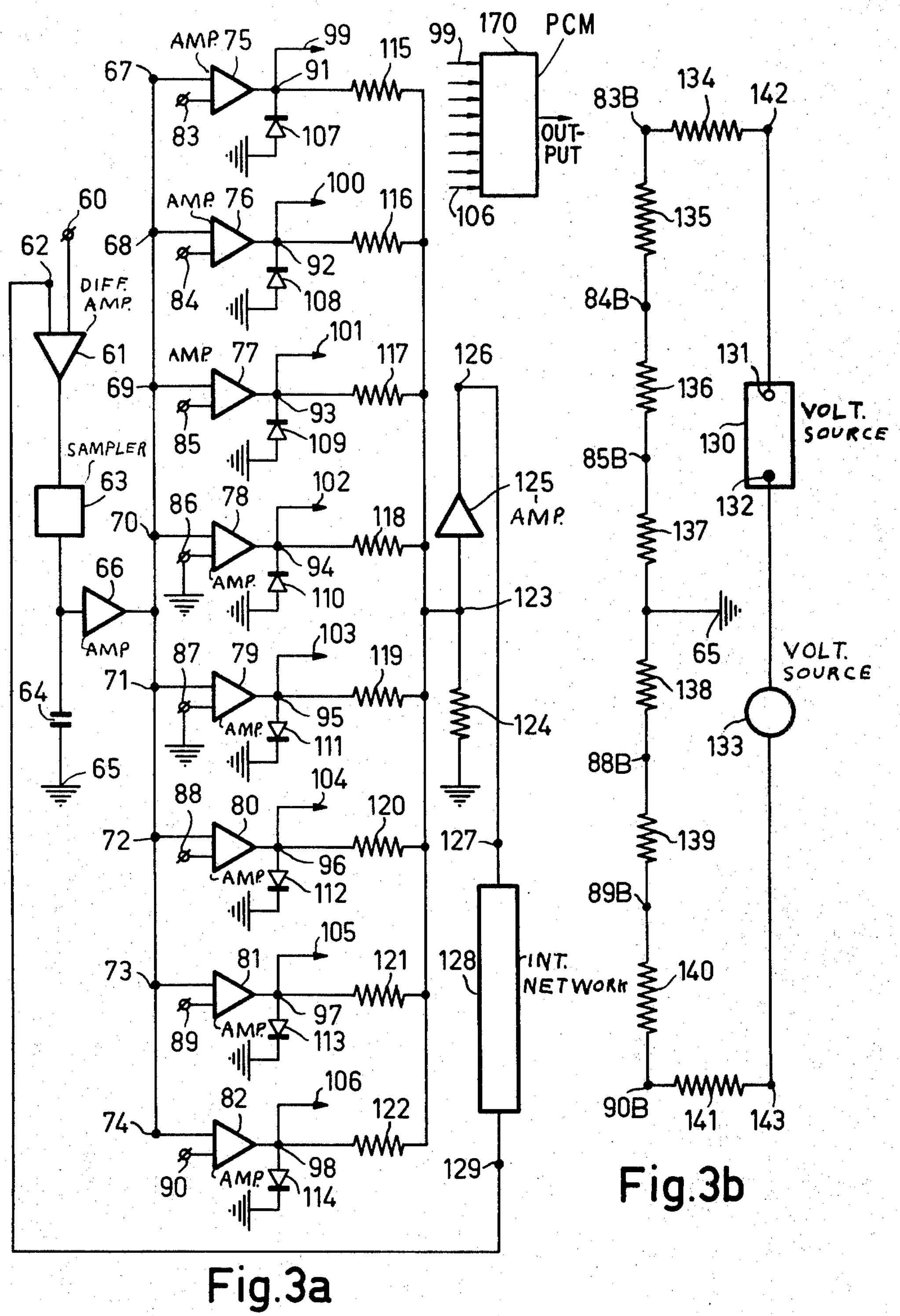

In order that the invention may be readily carried into effect, some embodiments thereof will now be described in detail, by way of example with reference to the accompanying diagrammatic drawings, in which:

FIGS. 1A, 1B and 1C show examples of the distribution of decision levels and representative levels in a quantizing circuit, FIG. 2 shows three embodiments which clearly represent the improvement in the display of the level variations of a signal, which improvement is obtained by using the steps according to the invention and in which two different values for each decision level are used, FIG. 3A shows a block diagram of a device according to the invention, FIG. 3B shows an embodiment of a circuit for obtaining the different decision levels when each decision level changes alternately from a maximum to a minimum value.

Figure 4:
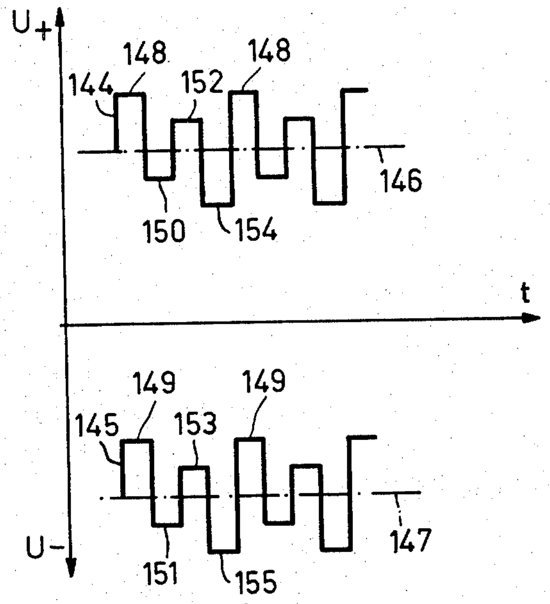
Figure 5:
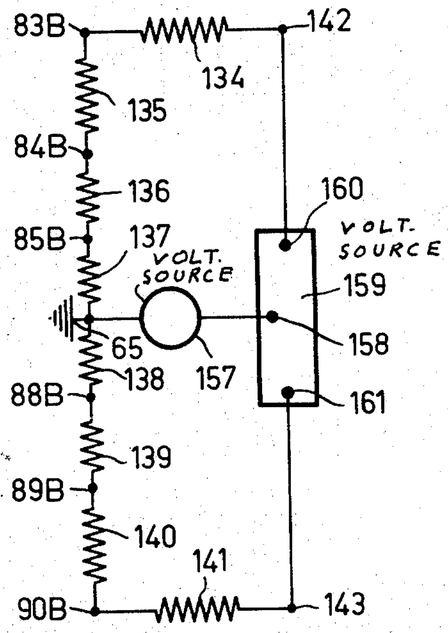
Figure 6:
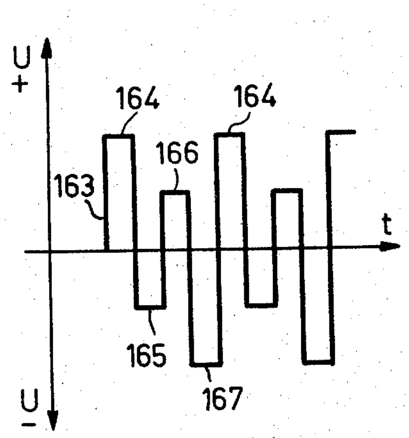

FIG. 4 shows in a time diagram the successive values of a given positive and negative decision level when using four different values for each decision level, FIG. 5 shows an embodiment of a circuit which provides variable decision levels having 4 discrete values in accordance with the time diagram of FIG. 4 and which cooperates with a device as shown in FIG. 3A, FIG. 6 shows in a time diagram the shape of the voltage provided by the voltage source 157 of FIG. 5 in order to obtain the succession of the decision level as shown in FIG. 4, FIG. 1A shows a known example of the distribution of decision level and representative levels in a quantizing circuit so as to quantize difference signals.

In accordance with a technique commonly used in such a case the deviations between the decision levels on the one hand and the representative levels on the other hand increase in such a manner that they are adapted as satisfactorily as possible to the transmission of large difference signals as well as to that of the small difference signals.

The distribution shown in FIG. 1A corresponds to the transmission of variations of the signal in the shape of four representative levels which correspond to difference signals whose amplitudes are equal to 2 percent, 8 percent, 18 percent and 40 percent, respectively, of the maximum amplitude of the information signal to be transmitted. Taking into account the two possible directions of variation, positive and negative, these four levels bring about eight distinct information signals which can be transmitted in a binary pulse code by means of code groups of three bits each.

The values of the four representative levels expressed in percents of the maximum amplitude of the information signal are written within squares in FIG. 1A. According to the example described, the use of one of the mentioned representative levels, independent of the direction of variation of the signals, is determined by the position of the difference signal observed during sampling relative to four decision levels: 0 percent, 5 percent, 13 percent and 29 percent whose values are written in FIG. 1A within circles which are connected to the scale for the difference signals and which in this embodiment varies from 0 percent to 45 percent. Four braces connect the decision levels to the representative levels and make it possible to see clearly that the transmitted representative level is 2 percent when a difference signal is found to be between 0 percent and 5 %. When the difference signal is more than 5 % and less than 13 %, the transmitted representative level is 8 %. When the difference signal is more than 13 % and less than 29 %, the transmitted representative level is 18 %. Finally, when the difference signal is more than 29 %, the transmitted representative level is 40 %.

FIGS. 1B and 1C illustrate the operation of the device according to the invention, in which coded difference signals are transmitted and in which the representative levels are the same as those of FIGS. 1A: 2 %, 8 %, 18 % and 40 %, but in which the decision levels are cyclically changed. According to this example the mean values of the decision levels are equal to those of the decision levels of FIG. 1A in order to simplify the comparison; in FIG. 1B the decision levels which are represented in the same manner as those in FIG. 1A have the values: 0 %, 4.14 %, 10.8 % and 24 %, in FIG. 1C the decision levels have the values: 0 %, 5.86 %, 15.2 % and 34 %. The decision levels used for a series of samplings become in a cyclic manner those of FIG. 1B, subsequently those of FIG. 1C, then again those of FIG. 1B and so forth while the period during which each series of decision levels is used in the transmission of a television video signal may be, for example, that of a picture line or even that of a picture field.

The example given in FIGS. 1B and 1C corresponds to the use of only the maximum and minimum values of the decision levels and in this example the variations in absolute values of the decision levels for the positive and negative difference are equal and symmetrical.

A scale 21 is shown on the left-hand side of FIG. 2, which scale is subdivided in percents of the maximum amplitude of the signals to be transmitted. The scale 21 makes it possible to evaluate the manner in which several difference signals of a television video signal are transmitted and hence displayed, dependent on whether or not the steps according to the invention are used.

The graph 22 represents the transmission of a difference signal having an amplitude of 12 % without using the steps according to the invention, in accordance with the representative levels and the decision levels of FIG. 1A. The level of 12 %, which corresponds to the level 25, is obtained in three stages having two intermediate stages which are represented by the levels 23 (amplitude 8 %) and 24 (amplitude 10 %) whose mean deviation from the level of 12 % is equal to $$4+2/2 = 3\ \%.$$

The graph 26 represents the transmission of a difference signal having an amplitude of 12 % while using the steps according to the invention, in accordance with the decision levels whose divisions are represented in FIGS. 1B and 1C. During the first scanning line in which, for example, the decision levels are those of FIG. 1B, the transmitted representative levels correspond to a signal shown in a broken line which includes the levels 27 (amplitude 18 %), 28 (amplitude 10 %) and 29 (amplitude 12 %); during a second scanning line in which, for example, the decision levels are those of FIG. 1C the transmitted representative levels correspond to a signal shown in a dotted line which includes the levels 30 (amplitude 8 %), 28 (amplitude 10 %) and 29 (amplitude 12 %). The mean value of the signal integrated by the eye on the two considered lines corresponds to the levels 31 (amplitude 13 %), 28 (amplitude 10 %) and 29 (amplitude 12 %).

The mean deviations of the porches 31 (amplitude 13 %) and 28 (amplitude 10 %) from the final porch 29 (amplitude 12 %) is only 1 − 2/2 = 0.5 %, which is equal to one sixteenth of the mean deviation obtained without using the steps according to the invention.

The graph 32 corresponds to the transmission of a difference signal having an amplitude of 25 % without using the steps according to the invention, in accordance with the representative levels and the difference levels of FIG. 1A. The level of 25 %, which corresponds to the mean value of the levels 34 (amplitude 26 %) and 35 (amplitude 24 %) is obtained after an intermediate level 33 (amplitude 18 %) and the mean deviation of these three levels from the amplitude 25 % is: $(-7+1-1)/3=2.3$ %

The graph 36 represents the transmission of a difference signal having an amplitude of 25 % while using the steps according to the invention, in accordance with the decision levels whose distribution are shown in 1B Abd. 1C. During a first scanning line in which, for example, the decision levels are those of FIG. 1B, the representative levels correspond to a signal shown in a broken line which includes the levels 37 (amplitude 40 %), 38 (amplitude 22 %), 39 (amplitude 24 % and 40 (amplitude 26 %), during a second scanning line in which, for example, the decision levels are those of FIG. 1C the transmitted representative levels correspond to a signal shown in a dotted line which includes the levels 41 (amplitude 18 %), 42 (amplitude 26 %) and 39 (amplitude 24 %). The mean signal integrated by the eye on the two considered lines corresponds to the levels 43 (amplitude 29 %) and 39 (amplitude 24 % during two samplings). The mean deviation of the levels 43 (amplitude 29 %) and 39 (amplitudes 24 %) from the level to be transmitted (amplitude 25 %) is only:

$$(+4-1-1)/3=0.6\ \%\ \text{(instead of 2.3 \%)}.$$

The graph 44 represents the transmission of a difference signal having an amplitude of 29 % without using the steps according to the invention, in accordance with the representative levels and the decision levels of FIG. 1A. The level 29 which corresponds to the mean value of the levels 47 (amplitude 30 %) and 48 (amplitude 28 percent) is obtained after two intermediate levels 45 (amplitude 40 %) and 46 (amplitude 32 %) and the mean deviations of the three first levels from the amplitude of 29 % is:

$(11+3+1)/3=5$ %.

The graph 49 represents the transmission of a difference signal having an amplitude of 29 % while using the steps according to the invention, in accordance with the decision levels whose distributions are shown in FIGS. 1B and 1C. During a first scanning line in which, for example, the decision levels are those of FIG. 1B the representative levels correspond to a signal shown in a broken line which includes the levels 50 (amplitude 40 %, 51 (amplitude 32 %), 52 (amplitude 30 %) and 53 (amplitude 28 %), during a second scanning line in which, for example, the decision levels are those of FIG. 1C the transmitted representative levels correspond to a signal shown in a dotted line which includes the levels 54 (amplitude 18 %), 55 (amplitude 26 %), 56 (amplitude 28 %) and 57 (amplitude 30 %). The mean signal integrated by the eye on the two considered lines corresponds to the level 58 (amplitude 29 %) and a mean deviation 0 relative to the difference level to be transmitted.

A further improvement of the reliability of the signal can be obtained for reception by an averaging method following from the integration performed by the eye over, for example, four picture fields. Such a result is obtained with the aid of intermediate decision levels which are located between the maximum and minimum values allotted to each decision level. In this manner the number of representative levels used may be reduced while maintaining the picture quality during reception.

It is necessary to take certain precautions when using such measures, which leads to a broad spread in values of a small number of representative levels: if the instantaneous minimum value is substantially equal to half the next high representative level, of which this instantaneous value determines the transmission, there is the risk of oscillation phenomena, In that case it is favorable to form the device in such a manner that the instantaneous variations of the decision levels relative their mean values have an opposite direction for the positive difference signals and the negative difference signals: for the same transmitted representative level the decision level for a negative difference signal is at a maximum when the decision level for a positive difference signal is at a minimum.

The input of the device according to the invention the block diagram of which is shown in FIG. 3A, consists of an input terminal 60 and a difference amplifier 61 formed as a difference producer provided with a second input terminal 62. The amplifier 61 is controlled in such a manner that the amplification factor is equal to unity and that the input impedance ranges from average to high and the output impedance is low. The output of the amplifier 61 is connected to the input of the sampler 63 functioning as a switch whose output is connected to an electrode of a capacitor 64 which serves as an instantaneous memory after each sampling of very short duration of the signal present at the output of the amplifier 61. The second electrode of capacitor 64 is connected to ground 65 of the device and the first electrode is connected to the input of an amplifier 66 which has a high input impedance and a low output impedance and whose amplification factor is equal to unity. The output of the amplifier 66 is connected to inputs 67, 68, 69, 70, 71, 72, 73, 74 which are associated with the difference amplifiers of high amplification factor 75, 76, 77, 78, 79, 80, 81, 82, respectively, whose supplies which consist of, for example, two equal voltage sources (not shown) of opposite polarity whose center is connected to ground which difference amplifiers 75 – 82 are each provided with second input terminals 83, 84, 85, 86, 87, 88, 89 and 90, respectively. The second inputs 83 – 90 of these difference amplifiers are used to provide to the device the value of each of the decision levels to be applied for the transmission of information signals in quantized form; the second inputs 86 and 87 associated with the amplifiers 78 and 79, respectively, are connected to ground 65 of the device and the other second inputs are connected to points in the circuit of FIG. 3B which have the same reference numerals with the addition of a letter B.

The outputs of the difference amplifiers 75, 76, 77, 78, 79, 80, 81 and 82 are connected to points 91, 92, 93, 94, 95, 96, 97 and 98, respectively, where the connections 99, 100, 101, 102, 103, 104, 105 and 106 commence which are connected to the inputs of a pulse code modulator 170 which pulse code modulator converts in known manner the electrical values applied to the inputs into code pulses in accordance with a binary pulse code having code groups of three bits which are transmitted to the receiver end.

Points 91, 92, 93, 94 are connected to the cathodes of semiconducting diodes, for example, germanium diodes 107, 108, 109, 110, respectively, whose anodes are connected to ground 65. The points 95, 96, 97, 98 are connected to anodes of semiconducting diodes 111, 112, 113, 114, respectively, whose cathodes are connected to ground 65. As a result, the points 91, 92, 93, 94 can only have a zero potential or become positive relative to ground 65 and the points 95, 96, 97, 98 can only have a zero potential or become negative relative to ground 65. Points 91, 92, 93, 94, 95, 96, 97, 98 are each connected to a point 123 through connecting resistors 115, 116, 117, 118, 119, 120, 121, 122, respectively. A resistor 124 of low value is arranged between ground 65 and point 123 which is furthermore connected to the input of an amplifier 125 having a stabilized amplification factor and a low output impedance. An output 126 of the amplifier 125 is connected to the input 127 of an integrating network 128 whose output 129 is connected to a second input 62 of the input difference amplifier 61. The integrating network 128 may consist in known manner of, for example, an amplifier having a negative feedback circuit in which a delay line is incorporated which has a delay corresponding to the period of the sampling frequency of the signal to be transmitted with the aid of the device according to the invention.

The operation of the device of FIG. 3A may be explained as follows: at each instant the voltage present at the output of the difference amplifier 61 is equal to the difference between the input signal present in point 60 and the comparison signal present at the input 62 and generated by the integrating network 128 and it will be evident hereinafter that the voltage available at the output is equal to the variation of the signal between the previous sampling and the instantaneous sampling at the very short instant when the switch of the sampler 63 is temporarily closed.

During the sampling operation considered, the voltage across capacitor 64 is made equal to the potential difference which then exists between the terminals 60 and 62 and this voltage is applied to the first inputs 67, 68, 69, 70, 71, 72, 73, 74 of the amplifiers, 75, 76, 77, 78, 79, 80, 81 and 82, respectively, through the amplifier 66 whose amplification factor is equal to unity.

The circuit shown in FIG. 3B applies the positive and negative voltages corresponding to the decision levels to the second inputs 83, 84, 85, 86, 88, 89, 90 of the difference amplifiers 75, 76, 77, 80, 81 and 82, respectively; when they are expressed in % of the maximum amplitude of the signals to be transmitted, these voltages, when using a division according to FIG. 1B, are: + 24; + 10.8; +4.14; – 4.14; – 10.8; – 24, respectively. Taking into account the conventional manner of operation of the amplifiers 75, 76, 77, 78, 79, 80, 81 and 82 and the presence of the diodes 107, 108, 109, 110, 111, 112, 113, and 114, the voltage present at the output of each of the amplifiers is equal to zero for those amplifiers whose voltage at the first input is lower than the voltage which corresponds to the decision level and which is applied to the second input by the circuit shown in FIG. 3B while this voltage is substantially equal to one of the positive or negative supply voltages of the mentioned amplifiers when the applied voltage is higher than the decision level of the said amplifiers. As a result a number of the inputs 99, 100, 101, 102, 103, 104, 105, 106 of the pulse code modulator not shown is substantially connected to ground 65 after each sampling while the other inputs have a positive voltage if inputs of the group 99, 100, 101, 102 are connected and a negative voltage if inputs of the group 103, 104, 105, 106 are concerned. The pulse code modulator can determine the code group of three bits to be transmitted from the voltages present at the inputs 99 – 106 in order to pass on the value of the quantized difference signal to be transmitted to the receiver.

The resistors 115, 116, 117, 118, 119, 120, 121, 122, 124 between the points 91, 92, 93, 94, 95, 96, 97, 98 and ground 65 are chosen in such a manner that the appearance of a positive or negative voltage whose value is in the vicinity of that of one of the supply voltages of the amplifiers 75, 76, 77, 78, 79, 80, 81 and 82 becomes manifest at an arbitrary output of the said amplifiers by a current component in the resistor 124 which is proportional to the deviation of the values between the representative level associated with the decision level of the amplifier considered and the next lower representative level or the zero level when the considered representative level in the positive scale or in the negative scale of the representative levels is closest to zero.

Dependent on the value of the difference signal present at the output of amplifier 66, a signal having a small amplitude and quantized according to the values of the decision levels and the introduced representative levels is present at the input of the amplifier having a stabilized amplification factor 125 which amplifier is constructed in such a manner that the polarity of the signal applied to its input is not inverted at the output. The amplified signal is applied to the input of the integrating network 128. The amplification factor of the amplifier 125 and the characteristics of the integrating network 128 are chosen to bessuch that the comparison voltage present at the output 129 of the network 128 is equal to the sum of the quantized representative difference signals for which the pulse code modulator 170 has determined the transmission. As a result the difference between the signal transmitted to the receiver after the previous sampling and the new instantaneous value of the signal applied to the input 60, which difference is determined by the sampler 63 at the instant of each sampling of the signal, is a measure of the magnitude and the sign of the new difference signal to be transmitted.

The circuit shown in FIG. 38 includes two separate voltage sources isolated from ground 65; a comparison voltage source 130 provided with a positive terminal 131 and a negative terminal 132 on the one hand and an alternating voltage source 133 on the other hand, which sources are arranged in series. According to the embodiment shown the voltage divider which determines the relative values of the decision levels consists of a resistor 134 which is arranged between the terminal 142 which is connected to a positive terminal 141 of the direct voltage source 130 and point 93B, a resistor 135 which is arranged between points 83B and 84B, a resistor 136 which is arranged between point 84B and point 85B, a resistor 136 which is arranged between point 85B and ground 65, a resistor 138 which is arranged between ground 65 and point 88B, a resistor 139 which is arranged between point 88B and point 89B, a resistor 140 which is arranged between point 89B and point 90B, a resistor 141 which is arranged between point 90B and a terminal 143 which is connected to a terminal of the alternating voltage source 133 a second terminal of which is connected to the negative terminal 132 of the direct voltage source 130.

In the voltage divider, the resistors 135 and 140, 136 and 139, 137 and 138 are pairwise equal and their values are such that the voltages which appear between the points 85B, 84B and 83B at one end and ground 65 at the other end correspond to decision levels + 5 %, + 13 % and + 29 % when the voltage between the terminals of the alternating voltage source 133 is equal to zero; the decision levels − 5 %, − 13 % and − 29 % appear at the same instant at the points 88B, 89B, and 90B, respectively.

During normal operation of the control circuit of FIG. 3B and dependent on the rhythm chosen for the modification of the decision levels, the source 133 now adds an auxiliary voltage to the voltage of the source 130 and now subtracts an auxiliary voltage from the voltage of source 130, which auxiliary voltage has a value of 17.25 % of the voltage of source 130 in conformity with the distributions shown in FIGS. 1B and 1C.

By using a control circuit for the quantizing circuit in FIG. 3A of the form shown in FIG. 3B the variation percentages of the different decision levels ranging from a minimum value to a maximum value are of course identical; this is not necessary, but it may be considered to be simple and advantageous.

In the described embodiment of the variations of the decision levels in accordance with FIG. 1B and FIG. 1C the alternating voltage provided by source 133 is a square-wave voltage; this is not necessary and the voltage provided by source 133 may have a different shape and may particularly be sinusoidal.

When the voltage provided by source 133 has a square-wave shape, the repetition frequency of the said voltage may be a rational part of the line frequency or the field frequency of the transmitted television video signal.

When the voltage provided by source 133 is a sinusoidal alternating voltage, the frequency of the said voltage may differ from that which corresponds to harmonics and subharmonics of the line frequency or of the field frequency of the transmitted television video signal.

Furthermore, it will be evident that the manner of supply of the voltage divider of FIG. 3B only constitutes a non-limiting example: for example, the direct voltage source 130 might consist of two series-arranged direct voltage sources whose center might be connected to earth, which sources cooperate with two alternating voltage sources placed on either side of the two elementary direct voltage sources; another possibility is the use of an alternating voltage source 133 having a center which is connected to ground 65, which source 133 is then arranged between two equal direct voltage sources which have no point at all connected to ground 65.

In FIG. 4 the broken line 144 shows the distribution with respect to time of the successive values of a given positive decision level having four discrete values during the analysis of the difference signal to be transmitted and the broken line 145 shows the associated variations of a corresponding negative decision level. The mean values of the decision levels are shown by a horizontal chain-like line 146, 147 and are equal in absolute value. When the positive decision level is at its maximum value 148, the negative decision level is at its minimum amplitude value 149; the positive decision level is subsequently brought to its lower intermediate value 150 and the negative decision level is brought to its higher absolute intermediate value 151; when the positive decision level is brought to the higher intermediate value 151, the negative decision level is brought to the lower absolute intermediate value 153; when the positive decision is then reduced to its minimum value 154, the negative decision level is increased to its maximum absolute value 155; at the next instant the higher decision level is reduced to its maximum value 148, the lower decision level is reduced to its absolute minimum value 149 and the modulation cycle of the decision level is continued in the same manner as before.

In FIG. 5 the reference numerals of FIG. 3A for the identification of the resistance elements of the potential divider and the connecting points are maintained because the composite elements of the two diagrams between the points 142 and 143 through the center connected to ground are identical. To obtain simultaneous variations in an opposite sense of the positive and negative decision levels as these are represented in FIG. 4, the supply circuit of the voltage divider shown in FIG. 5 need only be changed relative to FIG. 3B: an alternating voltage source 157 whose magnitude and polarity of the square-wave voltage are variable is placed between ground 65 of the control circuit and the center 158 of a direct voltage source 159 which is provided with a positive terminal 160 and a negative terminal 161 which are connected to the terminals 142 and 143 respectively of the potential divider the intermediate terminals of which are connected to suitable points of the device of FIG. 3A.

It is evident that the direct voltage source 159 which center 158 may be replaced by two individual sources which have no terminal at all connected to ground 65 and which each provide a voltage equal to half that of the source 159.

In FIG. 6 the broken line 163 illustrates the voltage provided by the alternating voltage source 157 as a function of time: a high positive level 165 gives the center 158 a positive voltage relative to ground 65, which results in the positive level 148 and the negative level 149 of FIG. 4; similarly a negative intermediate porch 165 corresponds to the levels 150 and 151, a positive intermediate level 166 corresponds to the levels 152 and 153 and a high negative level 167 corresponds to the levels 154 and 155.

As regards the amplitude, the ratio between the voltage corresponding to the level 164 of FIG. 6 and the value of half the voltage of the direct voltage 159 of FIG. 5 is equal to the number given by the difference between the mean level 146 of FIG. 4 and the decision level 148 of FIG. 4, divided by the value of the mentioned mean level 149.

The present invention is not limited to the embodiments described and the number of value porches of each decision level may differ from two or four when using square-wave modulation voltages for the decision levels: particularly, the values three and five may be used.

What is claimed is:

1. A device for the transmission of an information signal by means of a pulse code, said device comprising a quantizing circuit having a plurality of decision levels, said quantizing circuit producing a quantized signal, a comparison circuit coupled to the quantized signal, said comparison circuit comprising an integrating network for integrating a signal corresponding to the quantized signal, a difference producer for producing a difference signal, means to couple the information signal to the input means of the difference producer, means to couple the comparison circuit to the input means of the difference producer, means to couple the difference signal of the difference producer to the input means of the quantizing circuit, a pulse code modulator coupled to the output means of quantizing circuit, said pulse code modulator generating code groups characterizing the magnitude and sign of the difference signal, and a control circuit coupled to the quantizing circuit for cyclically changing between predetermined minimum and maximum values the respective decision levels from which the quantizing circuit determines representative levels for the quantized signal.

2. A device as claimed in claim 1, wherein the positive and negative decision levels which corresponds to a given representative level have the same absolute value at any instant.

3. A device as claimed in claim 1, wherein the positive and negative decision levels which correspond to a given representative level have a different absolute value at any instant.

4. A device as claimed in claim 1, wherein the control circuit comprises an alternating voltage source incorporated in the supply circuit of a voltage divider from which the different decision levels are derived.

5. A device as claimed in claim 1, wherein the information signal is a television video signal including line and field signals and the repetition frequency of the cycle within which the control circuit modifies the decision levels is a rational part of the line frequency or of the field frequency of the television video signal.

* * * * *